United States Patent [19]

Takayama et al.

[11] Patent Number: 5,193,734
[45] Date of Patent: Mar. 16, 1993

[54] JET SOLDER BATH

[75] Inventors: Kinjiro Takayama; Kenichi Tomitsuka, both of Kanagawa; Tatsuo Fujita, Tokyo; Hisashi Suwa, Kanagawa; Mitsuo Zen, Saitama; Hidetoshi Nakamura, Tokyo, all of Japan

[73] Assignees: Sony Corporation; Senju Metal Industry Co., Ltd., both of Japan

[21] Appl. No.: 823,964

[22] Filed: Jan. 22, 1992

[30] Foreign Application Priority Data

Jan. 28, 1991 [JP] Japan ................................ 3-8336

[51] Int. Cl.⁵ .................................................. B23K 3/00
[52] U.S. Cl. ...................................... 228/37; 228/56.2
[58] Field of Search ................ 228/34, 37, 56.1, 56.2, 228/214, 260

[56] References Cited

U.S. PATENT DOCUMENTS 3,037,274 6/1962 Hancock ................................ 228/36

FOREIGN PATENT DOCUMENTS

| 2619342 | 8/1977 | Fed. Rep. of Germany ........ 228/37 |
| 221661 | 5/1985 | Fed. Rep. of Germany ........ 228/37 |
| 1264 | 1/1981 | Japan ..................................... 228/37 |
| 13471 | 1/1983 | Japan ..................................... 228/37 |
| 82964 | 4/1986 | Japan ..................................... 228/37 |
| 70377 | 3/1990 | Japan ..................................... 228/37 |

Primary Examiner—Samuel M. Heinrich
Attorney, Agent, or Firm—Ronald P. Kananen

[57] ABSTRACT

A jet solder bath is comprised of a bath unit which contains a molten solder, a nozzle member provided within the bath unit and constructing a nozzle mouth, a tank provided in at least one side of the nozzle member along the nozzle mouth and temporarily accumulating a solder jetted from the nozzle mouth, and a molten solder outlet provided on the lower portion of the tank and communicating the tank with a molten solder still area provided within the solder bath unit under the liquid level of the molten solder. According to the above-mentioned arrangement, the molten solder can be suppressed from being oxidized as much as possible and the removal of a resultant oxide can be facilitated.

10 Claims, 2 Drawing Sheets

JET SOLDER BATH

BACKGROUND OF THE INVENTION

1. Field of the Invention

The present invention generally relates to solder baths and, more particularly, is directed to a jet solder bath which is assembled in an automatic soldering apparatus in order to carry out soldering on a printed circuit board.

2. Description of the Related Art

A jet solder bath is an apparatus in which a nozzle and a pump are installed within a solder bath. A molten solder supplied via the pump into the solder bath is jetted upward from the nozzle and the printed circuit board is brought in contact with the molten solder thus jetted to thereby solder a predetermined portion.

The temperature of the molten solder within the solder bath is 200° C. or more and, in addition, the molten solder is dropped into the solder bath after having been jetted upward so that the molten solder thus dropped and the molten solder within the bath are inevitably mixed. At that time, the molten solder is frequently exposed to the air and as a consequence, the molten solder is severely oxidized at the portion in which the molten solder is dropped. In the following description, the molten solder thus oxidized will be referred to as "oxide" for simplicity. The solder once oxidized loses a solder function and must be discarded, which causes a great loss from an economical standpoint.

Further, the oxide thus produced is collected near the nozzle mouth, i.e., in the nozzle mouth and the solder bath. If there are provided a primary nozzle and a secondary nozzle, the oxide is collected near the nozzle mouths thereof and also in the space between the respective nozzle mouths. If the oxide is accumulated, then the accumulated oxide is overflowed to the outside of the solder bath from the lower wall of the solder bath or the printed circuit board immersed into the molten soldering liquid within the solder bath is smudged by the accumulated oxide, thereby hindering the soldering on the printed circuit board. Furthermore, the accumulated oxide causes a failure in the soldering-process.

Furthermore, when the molten solder is dropped, peripheral devices are smudged by resultant solder splashes and therefore the peripheral devices are caused to malfunction. In some cases, the printed circuit board is smudged by solder splashes, which causes the failure in the soldering-process.

Accordingly, a jet solder bath in which a height from the jetted molten solder to the bath surface of the solder bath is reduced to suppress the solder from being oxidized, that is, a jet solder bath which can prevent the molten solder from being oxidized has been proposed.

In the conventional jet solder bath which can prevent the solder from being oxidized, solder tanks are provided at both sides of the nozzle to raise the liquid level at which the jetted molten solder is dropped. Thereby the height is reduced. Thus, a force in which the molten solder is dropped into the liquid surface is weakened, thereby reducing the amount of the solder oxide produced.

In the jet solder bath which is intended to prevent the molten solder from being oxidized, however, the molten solder is exposed to the air when the molten solder is jetted, which unavoidably causes the molten solder to be oxidized.

In addition, in order to obviate harmful influences brought about by the oxide, the oxide accumulated within the solder bath must be removed several times in a day. However, since the oxide is accumulated in the nozzle wall surface within the solder bath or in a very narrow place such as a spacing between the primary and secondary nozzles as earlier noted, it is very difficult to remove the oxide accumulated thereon.

To solve the above-mentioned problem, in the solder bath according to the prior art, the following proposal is made. That is, since most of oxide produced in the above solder tank is floated on the molten solder in the solder tank, the oxide together with the molten solder is dropped and collected into a second solder tank separately provided from an upper cutaway portion formed at one end or at the respective ends of the solder tank provided along the nozzle mouth. Then, in the second solder tank, the oxide is separated from the molten solder by the use of a proper filter or by making effective use of a difference of specific gravity between the oxide and the molten solder, and the molten solder from which the oxide is separated is recycled in the solder bath.

However, in a solder bath described in Japanese Laid-Open Patent Publication No. 61-82964, the molten solder must be flowed and dropped from the above-mentioned cutaway portion in order to remove the oxide floating from the solder tank provided along the nozzle mouth, which unavoidably allows the molten solder to be oxidized additionally in that portion.

OBJECTS AND SUMMARY OF THE INVENTION

Therefore, it is an object of the present invention to provide an improved jet solder bath in which the aforesaid shortcomings and disadvantages encountered with the prior art can be eliminated.

More specifically, it is an object of the present invention to provide a jet solder bath in which molten solder can be suppressed from being oxidized as much as possible.

Another object of the present invention is to provide a jet solder bath in which the removal of the oxide thus produced can be facilitated.

A further object of the present invention is to provide a jet solder bath in which a continuous soldering-process by using the jet solder bath can be carried out over a long period of time.

As an aspect of the present invention, a jet solder bath is comprised of a bath unit which contains a molten solder, a nozzle member provided within the bath unit and forming a nozzle mouth, a tank provided in at least one side of the nozzle mouth along the nozzle mouth and temporarily accumulating solder jetted from the nozzle mouth, and a molten solder outlet provided on the lower portion of the tank and communicating with the tank and a molten solder still area provided within the solder bath unit under the liquid level of the molten solder. According to the above-mentioned arrangement, the molten solder can be suppressed from being oxidized as much as possible and the removal of a resultant oxide can be facilitated.

The preceding and other objects, features, and advantages of the present invention will become apparent from the following detailed description of an illustrative embodiment thereof to be read in conjunction with the

DETAILED DESCRIPTION OF THE PREFERRED EMBODIMENT

Figure 1:
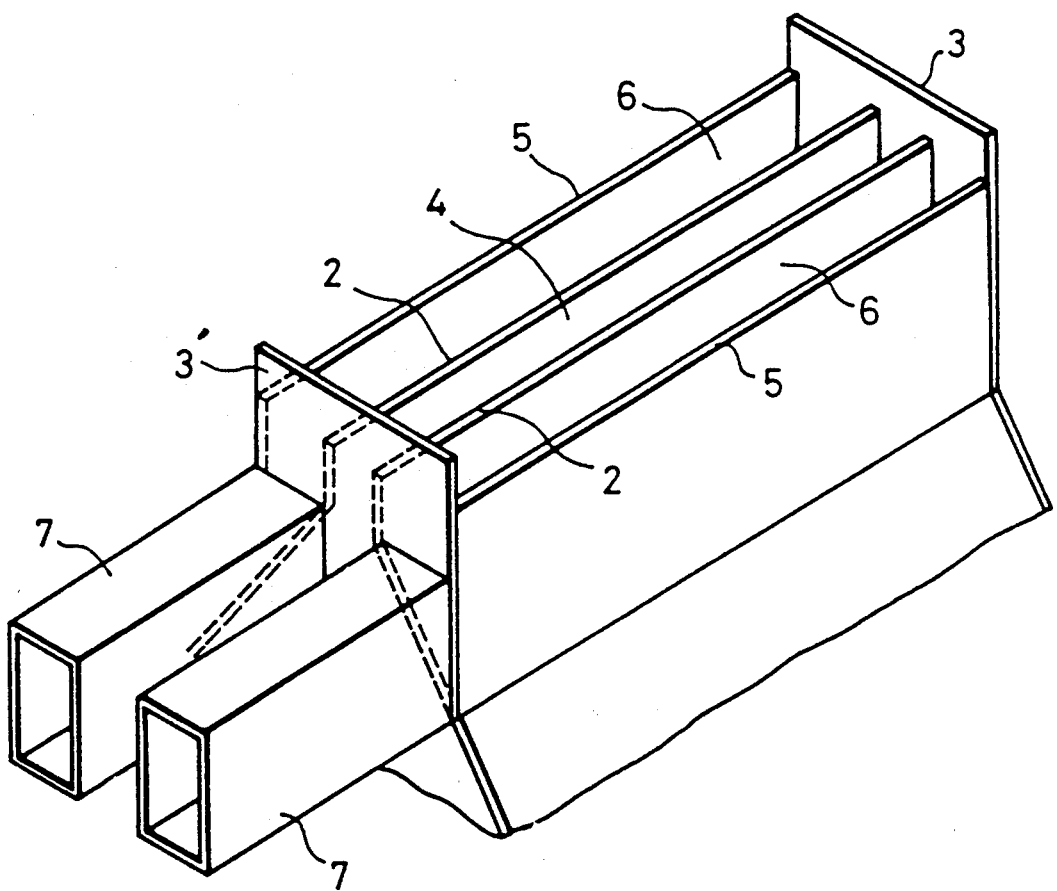
FIG. 1 is a perspective view of a main portion of an embodiment of a jet solder bath according to the present invention.

Prior to the description of a preferred embodiment of the invention, a fundamental principle of the present invention will be described below.

Having assembled an apparatus in actual practice and done various experiments, it was found that, even when an oxide is flowed from the bottom portion of a tank provided along a nozzle mouth, the oxide from a tank can easily flow together with a molten solder by the action of turbulent flow occurring at that portion without flowing together with the molten solder as a flow and that the molten solder can be flowed together with the oxide from the tank without being exposed to the air. If the molten solder is not exposed to the air as described above, the additional oxidation of the molten solder at that time can be avoided completely and the molten solder can be prevented from being oxidized when the molten solder flows and dropped from the tank unlike the prior art. Further, if a molten solder outlet mouth of the tank is opened within the solder bath unit, the oxide can be floated in a wide portion which is a part of the solder bath unit unlike the aforementioned narrow portion. With the above-mentioned arrangement, the oxide can be removed with great ease.

In the broadest sense standpoint, the present invention is directed to a jet solder bath in which a solder tank, which can temporarily accommodate a molten solder jetted from a nozzle mouth provided within the solder bath unit, is installed along the nozzle mouth. In this jet solder bath, an outlet which communicates the tank and the inside of the solder bath unit under the liquid level of the molten solder is attached to the lower portion of the tank.

That is, the most specific feature of the present invention is to provide a jet solder bath which is comprised of a bath unit which contains a molten solder, nozzle members provided within the bath unit and forming a nozzle mouth, a tank provided in at least one of the nozzle members along the nozzle mouth and temporarily accumulating solder jetted from the nozzle mouth, and a molten solder outlet provided on the lower portion of the tank and communicating with the tank and a molten solder still area provided within the solder bath unit under the liquid level of the molten solder. According to the above-mentioned arrangement, the molten solder can be suppressed from being oxidized as much as possible and the removal of a resultant oxide can be facilitated.

According to the preferred embodiment of the present invention, the molten solder still area is isolated from other areas of the solder bath unit by the upper partition, thereby the oxide once separated being prevented from being spread to the entire surface of the molten solder within the solder bath.

In accordance with the present invention, the molten solder is moved from the tank into the still area only by the liquid pressure difference not by the free dropping of the molten solder unlike the prior art. In that case, unexpectedly, even the oxide, which tends to float, can flow together with the molten solder by the action of a kind of turbulent flow occurred within the tank. Accordingly, the amount of the oxide floating on the upper portion of the tank can be reduced considerably and the most of the oxide can be floated and separated from the molten solder in the still area. Thus, the oxide can be removed within this still area with great ease as compared with the aforementioned work in the tank. Furthermore, during the soldering-process, the oxide can be removed and therefore the jet solder bath of the present invention is excellent in workability.

The present invention will now be practically described in detail with reference to the accompanying drawings.

Figure 2:
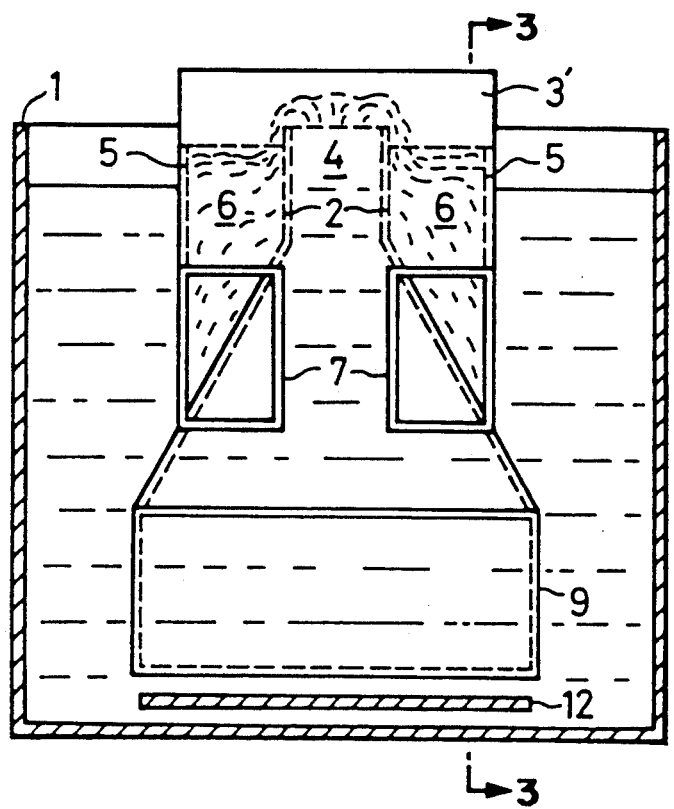
FIG. 2 is a side view thereof.
Figure 3:
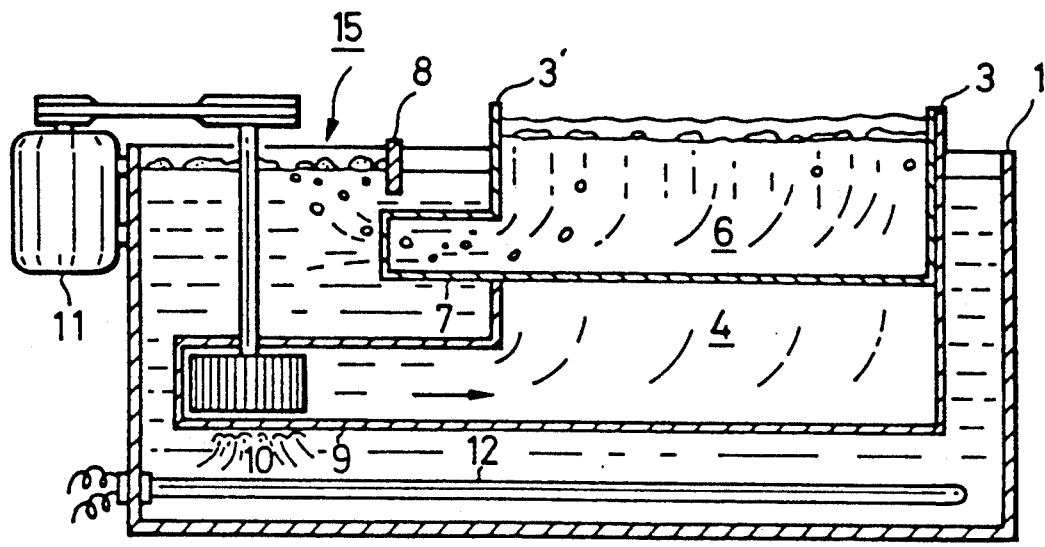
FIG. 3 is a cross-sectional view taken through the line A—A in FIG. 2.

FIG. 1 shows a perspective view of a main portion of an embodiment of a jet solder bath according to the present invention, FIG. 2 is a side view thereof and FIG. 3 shows a cross-sectional view taken through the line A—A in FIG. 2.

As illustrated in FIGS. 1 and 2, within a solder bath 1 of a jet solder bath, a nozzle mouth 4 is comprised of a pair of nozzle plates 2, 2 and a pair of side plates 3, 3' provided as nozzle members and partitions 5, 5 are erected at both sides of the nozzle mouth 4. Thus, the nozzle plates 2, 2 and the partitions 5, 5 constitute solder tanks 6, 6 extended along the nozzle mouth 4. The solder tanks 6 will hereinafter be referred to as "tanks 6" for simplicity. Outlets 7, 7 of duct configurations attached to the lower portion of the side surface of the longitudinal direction of the tanks 6, that is, on the side plate 3'. In the illustrated example, the outlets 7, 7 are shaped as the ducts and the side plate 3' constructing one ends of the outlets 7, 7 is bored and communicated with the tanks 6. The outlets 7, 7 may be attached to any of the side surfaces of the longitudinal directions of the tanks 6 and it is preferable that they may be attached to the side opposing the wide area to facilitate the removal of the oxide, that is, to the side in which a pump 10 is installed as shown in FIG. 3.

The outlet 7 may be simply shaped as a mouth and may be shaped as the duct as shown in this embodiment. Particularly, it is preferable that the outlet 7 may be shaped as the long duct in order to prevent the oxide from floating near the tanks 6 after the oxide was once flowed out. If an upper partition 8 is provided on the upper portion of the mouth of the outlet 7 as shown in FIG. 3, then the floated oxide is blocked by this upper partition 8 and can be prevented from being accumulated near the nozzle member or the tank, thereby facilitating the removal of the oxide more.

As is clear from FIG. 3, the lower portion of the nozzle mouth 4 is coupled to a duct 9 and the pump 10 is installed on the end portion of the duct 9. In FIG. 3, reference numeral 11 depicts a motor which is used to drive the pump 10 and reference numeral 12 a heater which is used to heat the solder within the solder bath 1.

With reference to FIGS. 2 and 3, the following is a description of the action of the oxide of the molten solder within the jet solder tank having the above-mentioned structure according to the present invention.

As shown in FIG. 3, when the pump 10 is driven by the motor 11, the molten solder is introduced into the duct 9 from the under side of the pump 10 and sent into the nozzle mouth 4. The molten solder thus sent to the nozzle is jetted from the nozzle mouth 4 and dropped into the respective sides of the nozzle. In this case, as shown in FIG. 2, the tanks 6 are provided on both sides of the nozzle so that the molten solder dropped is temporarily accumulated therein. The liquid level of the tank 6 is slightly higher than the liquid level of the solder tank 1 and this difference between the two liquid levels is selected to be as small as possible to effectively prevent the molten solder from being oxidized when the molten solder is dropped into the tanks 6. Further, this height is effectively utilized to cause the molten solder to flow from the tanks 6.

The difference at that time is preferably selected in a range of about 10 to 20 mm, whereby the difference between the liquid levels after the molten solder is jetted is reduced sufficiently. As a consequence, the molten solder and the air can be rarely stirred with each other, thereby suppressing the occurrence of the oxide. However, no matter how the molten solder and the air are rarely stirred with each other, the oxide is unavoidably produced because the temperature of the molten solder is high and the molten solder is exposed to the air when it is jetted.

While the oxide thus produced is smaller than the molten solder in specific gravity and therefore floats on the upper portion of the tank, the oxide is caught up in the flow of the molten solder dropped from the nozzle mouth 4 and becomes a turbulent flow, which is then flows from the outlet 7 together with the molten solder. Then, the oxide flows from the mouth of the outlet 7 is floated on a wide portion of a still area 15 within the solder bath 1. At that time, if the upper partition 8 is provided in the solder bath 1, then the oxide is not flowed over the upper partition 8 to the nozzle member side but is collected in the wide place where the pump 10 is installed.

According to the present invention, the molten solder can be recycled and the molten solder can be suppressed from being oxidized as much as possible. Also, the oxide flowed from the tank can be collected in the predetermined wide area so that the oxide can be removed with great ease. Thus, the jet solder bath of the present invention can achieve excellent effects unlike the conventional jet solder bath.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. A jet solder bath comprising:
(a) a bath unit which contains a molten solder;
(b) a nozzle member provided within said bath unit and forming a nozzle mouth;
(c) a tank provided in at least one side of said nozzle mouth and temporarily accumulating solder jetted from said nozzle mouth;
(d) a molten solder outlet provided on a lower portion of said tank and communicating with said tank and a molten solder still area provided within said solder bath unit under the liquid level of the molten solder; and
(e) an upper partition installed above a mouth of said molten solder outlet.

2. A jet solder bath according to claim 1, in which the liquid level of said tank is slightly higher than that of said bath unit.

3. A jet solder bath according to claim 1, in which a difference between said liquid levels falls in a range of about 10 to 20 mm.

4. A jet solder bath according to claim 1, in which said molten solder outlet is shaped as a duct.

5. A jet solder bath according to claim 1, further comprising another tank provided in the other side of said nozzle mouth along said nozzle mouth and temporarily accumulating said solder jetted from said nozzle mouth.

6. A jet solder bath according to claim 5, further comprising another molten solder outlet provided on the lower portion of said another tank and communicating said another tank with said molten solder still area.

7. A jet solder bath, comprising:
a bath unit for containing a molten solder having a liquid level and having a still area within said bath unit beneath the liquid level of the solder, said bath unit means including a nozzle member provided with said bath unit means and including a nozzle mouth, a portion of said nozzle mouth receiving molten solder from a pump jetted from said nozzle mouth to respective sides of said nozzle member;
at least one tank provided in at least one side of said nozzle mouth for temporarily accumulating solder jetted from said solder mouth;
a molten solder outlet provided at a lower portion of said one tank and communicating with the one tank and said molten solder still area, the liquid level of the tank being slightly higher than the liquid level of the solder in the one tank, and arranged so that molten solder oxide produced floats on an upper portion of said tank for inclusion in the flow of molten solder dropped from the nozzle mouth; and
a partition provided in the molten solder bath unit for inhibiting solder oxide flow over said partition to a side of the nozzle member and for collecting said oxide in said still area within the solder bath.

8. A jet solder bath as set forth in claim 7, wherein a difference between the solder level of said one tank and the solder level of the bath unit is selected to be small to minimize oxidation of the molten solder when dropped into said at least one tank.

9. A jet solder bath as set forth in claim 8, wherein said difference is in a range of about 10 to about 20 mm.

10. A jet solder bath as set forth in claim 7 further including another tank provided on a side of said nozzle mouth opposite said one tank for temporarily accumulating solder jetted from said nozzle mouth.

* * * * *